(12) United States Patent
Strey et al.

(10) Patent No.: US 10,246,568 B2
(45) Date of Patent: Apr. 2, 2019

(54) PRODUCTION OF POROUS MATERIALS BY THE EXPANSION OF POLYMER GELS

(71) Applicant: SUMTEQ GMBH, Köln (DE)

(72) Inventors: Reinhard Strey, Dormagen (DE); Roland Oberhoffer, Köln (DE); Alexander Müller, Köln (DE)

(73) Assignee: SUMTEQ GmbH, Cologne (DE)

( * ) Notice: Subject to any disclaimer, the term of this patent is extended or adjusted under 35 U.S.C. 154(b) by 185 days.

(21) Appl. No.: 15/036,769

(22) PCT Filed: Nov. 17, 2014

(86) PCT No.: PCT/EP2014/074789
§ 371 (c)(1),
(2) Date: May 13, 2016

(87) PCT Pub. No.: WO2015/071463
PCT Pub. Date: May 21, 2015

(65) Prior Publication Data
US 2016/0280876 A1 Sep. 29, 2016

(30) Foreign Application Priority Data

Nov. 15, 2013 (DE) .................. 10 2013 223 391

(51) Int. Cl.
*B29C 44/34* (2006.01)
*C08J 9/12* (2006.01)
(Continued)

(52) U.S. Cl.
CPC ............ *C08J 9/122* (2013.01); *C08J 9/0014* (2013.01); *C08J 9/0023* (2013.01); *C08J 9/141* (2013.01); *C08J 9/18* (2013.01); *C08J 9/28* (2013.01); *C08J 9/34* (2013.01); *B29C 44/3453* (2013.01); *C08J 2201/026* (2013.01); *C08J 2201/03* (2013.01); *C08J 2201/032* (2013.01); *C08J 2201/0502* (2013.01); *C08J 2203/06* (2013.01); *C08J 2203/14* (2013.01);
(Continued)

(58) Field of Classification Search
CPC ........................... C08J 2205/026; C08J 9/122
See application file for complete search history.

(56) References Cited

U.S. PATENT DOCUMENTS 4,367,290 A 1/1983 Ito et al.
5,158,986 A 10/1992 Cha et al.
(Continued)

FOREIGN PATENT DOCUMENTS

CA 2 800 378 A1 11/2011
CN 1318580 A 10/2001
(Continued)

OTHER PUBLICATIONS

"Progress in Understanding of Polymer Crystallization." ed. Gunter Reiter, Gert R. Strobl. 2007. p. 333. (Year: 2007).*
(Continued)

*Primary Examiner* — Michael M Dollinger
*Assistant Examiner* — Christina H Wales
(74) *Attorney, Agent, or Firm* — Knobbe Martens Olson and Bear, LLP

(57) ABSTRACT

A method for producing porous materials is disclosed. The porous materials can be produced by expansion of polymer gels.

13 Claims, 12 Drawing Sheets

(51) Int. Cl.
*C08J 9/00* (2006.01)
*C08J 9/14* (2006.01)
*C08J 9/18* (2006.01)
*C08J 9/28* (2006.01)
*C08J 9/34* (2006.01)

(52) U.S. Cl.
CPC .... *C08J 2205/024* (2013.01); *C08J 2205/042* (2013.01); *C08J 2205/044* (2013.01); *C08J 2300/22* (2013.01); *C08J 2323/06* (2013.01); *C08J 2323/12* (2013.01); *C08J 2325/06* (2013.01); *C08J 2327/06* (2013.01); *C08J 2333/12* (2013.01); *C08J 2367/04* (2013.01); *C08J 2369/00* (2013.01)

(56) References Cited

U.S. PATENT DOCUMENTS

| | | | |
|---|---|---|---|
| 7,838,108 | B2 | 11/2010 | Thiagarajan et al. |
| 7,842,735 | B2 * | 11/2010 | Jacobs ............... C08J 9/122 521/145 |
| 2006/0229373 | A1 * | 10/2006 | Guerra ............... C08J 9/28 521/142 |
| 2007/0259979 | A1 | 11/2007 | Lee |
| 2013/0260133 | A1 | 10/2013 | Strey et al. |
| 2015/0203647 | A1 * | 7/2015 | Zhu ............... B29C 44/348 521/88 |

FOREIGN PATENT DOCUMENTS

| | | |
|---|---|---|
| DE | 10 2005 001 636 A1 | 7/2006 |
| EP | 0 258 669 A2 | 3/1988 |
| EP | 0 750 006 A1 | 12/1996 |
| EP | 1165213 B1 | 7/2003 |
| EP | 1 646 687 B1 | 2/2007 |
| EP | 2 185 620 B1 | 4/2011 |
| JP | S55127443 A | 10/1980 |
| JP | 56-133338 A | 10/1981 |
| JP | S5867423 A | 4/1983 |
| JP | 7-330940 A | 12/1995 |
| JP | 11-130897 A | 5/1999 |
| JP | 2003-55495 A | 2/2003 |
| JP | 2007-70512 A | 3/2007 |
| WO | 00/50159 A1 | 8/2000 |
| WO | 2008/003623 A1 | 1/2008 |
| WO | 2009/009252 A1 | 1/2009 |
| WO | 2009/092505 A1 | 7/2009 |
| WO | 2011/054873 A2 | 5/2011 |
| WO | 2011/066060 A1 | 6/2011 |
| WO | 2011/112352 A1 | 9/2011 |

OTHER PUBLICATIONS

Mochizuki et al. "Physical Gels of Syndiotactic Polystyrene With Fragrant Molecules" Macromol. Chem. Phys. 2013, 214, 1912-1920. (Year: 2013).*
Rubens, L.C. "Some Effects of Crosslinking Upon the Foaming Behavior of Heat Plastified Polystyrene" J. Cellular Plastics, vol. 2, 1965. pp. 311-320 (Year: 1965).*
International Preliminary Report on Patentability dated May 17, 2016 of PCT/EP2014/074789 which is the parent application and its English Translation—36 pages.
Database WPI, Week 198046, Thomson Scientific, London, GB; AN 1980-81697C, XP002735494, & JP S55 127443 A (Seiisui Plastics Co Ltd) Oct. 2, 1980 (Oct. 2, 1980) Zusammenfassung.
International Search Report dated May 19, 2015 of PCT/EP2014/074789 which is the parent application and its English Translation—24 pages.
D. F. Baldwin et al., "A Microcellular Processing Study of Poly(Ethylene Terephthalate) in the Amorphous and Semicrystalline States. Part I: Microcell Nucleation", Polymer Engineering and Science, vol. 36, pp. 1437-1445 (1996).
D. F. Baldwin et al. "A Microcellular Processing Study of Poly(Ethylene Terephthalate) in the Amorphous and Semicrystalline States. Part II: Cell Growth and Process Design", Polymer Engineering and Science, vol. 36, pp. 1446-1453 (1996).
J. S. Colton et al., "The Nucleation of Microcellular Thermoplastic Foam With Additives: Part I: Theoretical Considerations", Polymer Engineering and Science, vol. 27, pp. 485-492 (1987).
J. S. Colton et al., "The Nucleation of Microcellular Thermoplastic Foam With Additives: Part II: Experimental Results and Discussion", Polymer Engineering and Science, vol. 27, pp. 493-499 (1987).
J. S. Colton et al., "Nucleation of Microcellular Foam: Theory and Practice", Polymer Engineering and Science, vol. 27, pp. 500-503 (1987).
Merlet et al. "'Self-Foaming' Poly(phenylquinoxaline)s for the Designing of Macro and Nanoporous Materials", Macromolecules, vol. 41, pp. 4205-4215 (2008).
Kistler, "Coherent Expanded Aerogels and Jellies", Nature, vol. 127, No. 1 (1931).
Tieke, B.; "Makromolekulare Chemie", Weinheim 2008, chapters 1.1-1.3.
Krause et al., "Open Nanoporous Morphologies from Polymeric Blends by Carbon Dioxide Foaming", Macromolecules, vol. 35, No. 5, Jan. 2002, pp. 1738-1745.
German Office Action dated Mar. 7, 2014 of German Patent Application No. 102013223391.4 with English translation—7 pages.
German Written Opinion dated May 19, 2015 of PCT/EP2014/074789 which is the parent application with English translation—36 pages.
Office Action of corresponding Japanese Patent Application No. 2016-530983—7 pages (dated Aug. 15, 2018).

* cited by examiner

PRODUCTION OF POROUS MATERIALS BY THE EXPANSION OF POLYMER GELS

The invention relates to a method for the production of porous materials by the expansion of polymer gels and to the porous materials produced by such a method and to a moulded body.

BACKGROUND OF THE INVENTION

The preparation of nanoporous materials is a high-ranking goal of current research. The goal is to develop methods which on the one hand allow a cost-effective and straightforward access to such materials and on the other hand include the possibility of implementing said method on an industrial scale.

There are several methods for preparing nanoporous materials which, however, have not been implemented on a larger scale due to the complex preparation and costly use of materials and machines. Hence, for example, silicon-based aerogels having open-cell structures between 1 and 30 nm could be synthesised according to Kistler by a sol-gel process. Due to a subsequent supercritical drying, this initially very simple sol-gel process becomes a complicated and tedious endeavour. Here, the solvent must be extracted carefully from a prepared silica gel by supercritical drying without damaging the extremely fine nanostructure (S. S. Kistler. Nature, 127:1 (1931)).

Based on Colton's and Suh's idea to saturate polymers with foaming agents and subsequently expand them above their glass temperature, Krause et al. were able to add supercritical $CO_2$ to polyether imides and polyether sulfones and thus prepare nanoporous materials they called polymer nanofoams (J. S. Colton; N. P. Suh. Polymer Engineering and Science, 27:485-492 (1987); J. S. Colton; N. P. Suh. Polymer Engineering and Science, 27:493-499 (1987); J. S. Colton; N. P. Suh. Polymer Engineering and Science, 27:500-503 (1987); D. F. Baldwin et al. Polymer Engineering and Science, 36:1437-1445 (1996); D. F. Baldwin et al. Polymer Engineering and Science, 36:1446-1453 (1996)). Here, the preparation includes the saturation of a polymer film having a thickness of several millimeters at pressures of approx. 50 bar and temperatures from 100-250° C. for several hours (B. Krause et al. Macromolecules, 35:1738-1745 (2002); B. Krause et al. Macromolecules, 34:8792-8801 (2001)).

Merlet et al. developed self-foaming polymer systems and achieved pore diameters in the range of 10 to 700 nm. Using the polymer polyphenylquinoxaline that contains heat-labile tert-butyloxycarbonyl groups, they were able to release $CO_2$ and isobutene in the polymer by increasing the temperature and thus obtain a nanoporous material (S. Merlet et al. *Macromolecules*, 41:4205-4215 (2008)).

JP S58-67 423 A describes the manufacture of a polycarbonate foam.

CN 1318580 describes the manufacture of a polymer foam.

U.S. Pat. No. 7,838,108 B2 has already claimed nanocellular polymer foams. This patent describes a method for manufacturing the protected material on the basis of a typical solution process of a foaming agent in a polymer. As described in the above references, this method involves very high pressures, temperatures and extremely long residence times of the polymer in the foaming agent. Thus, also this method is uneconomical and reasonably applicable only to small sample thicknesses. Moreover, a thermal conductivity from 1 to 10 mW/(m·K) is indicated for the protected polymer material in claim 1 of U.S. Pat. No. 7,838,108 B2, which lies in a range that can only be achieved by evacuating porous materials to date (vacuum insulation panels).

EP 2 185 620 B1 describes a method for preparing micro- and nanoporous xerogels based on polyurea. Generally, in the preparation of a xerogel or also an aerogel, a gel consisting of a solid and a solvent is prepared from a sol. The gel transforms into a porous material by exchanging the solvent by a gas (air, for example). Here, it must be remembered that the gel body is already the maximum volume that can be obtained after drying the porous material. Thus, the expected density of the porous material only depends on the ratio of solid to solvent. There is therefore no volume increase by an expanding foaming agent in terms of a foaming process. In addition to the inorganic silica-based aerogels described by Kistler, the mentioned patent describes a method that also makes organic aerogels/xerogels accessible.

EP 1 646 687 B1 describes the manufacture of nano- or microporous syndiotactic polystyrene. Here, a gel is prepared from a suitable solvent and syndiotactic polystyrene and subsequently processed into a porous syndiotactic polystyrene material by super- or nearcritical drying with $CO_2$. As described in this patent, during the super-/nearcritical drying (residual solvent content <1 wt % (percent by weight)) the solvent is removed nearly completely and the expansion to normal pressure is carried out during 60 to 120 minutes. The examples of the patent describe that after drying the polymer material has the same shape and dimensions as the original gel. Thus, also this method does not provide an increase in volume in terms of an expansion of a foaming agent to produce a porous polymer material but an exchange of solvent by a gas (air). The ratio of polymer to solvent in the starting gel is significantly responsible for the resulting density of the dried porous polymer material. Therefore, already during the gel manufacturing process care is taken to keep the polymer content in proportion to the solvent as small as possible (1-50 wt %) to obtain a target material with the lowest possible density.

All mentioned methods are either very time-consuming or expensive.

Hence, there is a substantial interest in simplifying the existing methods for preparing polymer foams and therefore also in improving the obtained polymer foams, which allows to reduce productions costs and to open up new areas of application.

SUMMARY OF THE INVENTION

Now, there has been found an improved method for the production of polymer nano foams that is preferably designated as "Nano-Foam by Gel-Acetone Foam Formation via Expansion Locking" (NF-GAFFEL). Contrary to the existing options, NF-GAFFEL is preferably carried out without the need for expensive chemicals and uneconomical process parameters. The basic principle is based on the preparation of a polymer gel that is obtained from a polymer using a plasticiser (a gelling agent, for example).

Plasticisers within the meaning of the translation are preferably liquids (under normal conditions) which ensure that the polymer is transferred into a gel or a gel-like state. Accordingly, they convert the polymer to a soft state and may also be referred to as gelling agents, for example.

Here, for example, the spaces between polymer chains are swollen by the plasticiser and preferably on a nanoscopic level a kind of bicontinuous structure consisting of polymer strands and plasticiser is formed. In the next step the swollen gel is contacted with a foaming agent such as $CO_2$, for example, under high pressure and preferably thermostated. When applying the foaming agent, the parameters of pressure and temperature are preferably selected such that the plasticiser (acetone, for example) and the foaming agent ($scCO_2$, that is supercritical $CO_2$) exist in a completely mixed state. Namely, this allows the foaming agent to penetrate the swollen polymer in a spontaneous, barrier-free way since a homogeneous mixture of plasticiser and foaming agent is formed for thermodynamic reasons. Preferably, the plasticiser can be extracted from the polymer gel by a subsequent rapid pressure decrease, whereby the glass transition point of the polymer increases dramatically. Supported by the cooling action of the adiabatically expanding gas, the polymer thus can solidify in the form of a nanoporous material.

Thus, the invention relates to
(1) a method for the production of a micro- and nanoporous polymer material, wherein
(a) the polymer starting material is swollen with a plasticiser at a preset temperature whereby it changes into a viscoelastic formable (in particular deformable) state,
(b) subsequently the swollen polymer is contacted with a foaming agent under high pressure, and
(c) the pressure is lowered whereby the micro- and nanoporous material solidifies; and
(2) a micro- or nanoporous polymer material obtainable by a method according to aspect (1) of the invention.

Preferably, step (b) is always carried out after step (a).

In step (b) the swollen polymer preferably forms a macroscopically coherent body which is subsequently contacted with a foaming agent under high pressure.

According to the invention, in step (b) the plasticiser and the foaming agent preferably mix in the nanometer-sized spaces of the polymer strands.

Due to the nanostructure of the foam, properties such as low thermal conduction, high stability and optical transparency may be achieved. These foams may be used as insulation materials, optically transparent sheets having insulating properties, nanofilters, for sound absorption, for optically active elements with a large surface area, etc. The most important viewpoint for the production of such materials using NF-GAFFEL is the convertibility to a continuous and large-scale process. For example, the polymer gels can be extruded without any problems and at typical extrusion pressures and temperatures, for example, the foaming agent also achieves the properties which may be required for a successful implementation of NF-GAFFEL.

For instance, polymer nanofoams such as polymer nanofoams made of PMMA, PS and PVC, for example, can be produced without any problems by using NF-GAFFEL. Preferably, the polymer is an at least partially crosslinked copolymer. Since the process includes the generation of a polymer gel preferably made of a solid polymer and a plasticiser, various polymers can be foamed by this method. In a preferred embodiment for a successful implementation of the method according to the invention, the correct choice of the plasticiser for the preparation of the polymer gel and additionally the prerequisite of a complete miscibility between plasticiser and foaming agent under high pressure are the critical requirements.

In the work of Colten, Suh and Krause (prior art) the polymer is directly saturated with the foaming agent under high pressure, which is a very slow process. Long saturation times are avoided by initially charging the polymer gel which can preferably be saturated with a plasticiser at atmospheric pressure and only then adding the foaming agent, since the diffusion process of the foaming agent into the polymer gel is surprisingly fast. Thus, the new method preferably comprises three steps specific to the invention: 1. the new possibility to mix polymers and foaming agents quickly on a nanoscopic level and 2. to expand them to a nanoporous material and additionally 3. to carry out the method in a continuous process.

Ideally, the polymer gels can be prepared at room temperature and normal pressure and this preparation is therefore an easy to implement process both for small samples and larger quantities. Moreover, gel production can be accelerated by increasing the polymer surface, increasing the temperature and by convection. For a continuous production of nanofoams by the method of the invention (NF-GAFFEL), the polymer gels can preferably be prepared in mixing units or by extrusion just before the actual foaming process and initially charged. Hence, this prerequisite ensures a production of nanofoams starting from a solid polymer in a continuous process.

The inventive initially charging of the polymers in the form of a gel structure ensures a homogeneous and time-efficient filling of the polymers with a pressurised foaming agent. Preferably, the pressure and the temperature should be selected such that the plasticiser and the foaming agent form a one-phase mixture, which is the prerequisite for the fast diffusion process of the foaming agent into the polymer gels. The gel infiltrated with foaming agent and plasticiser becomes a nanocellular foam by expansion. Here, the escaping foaming agent preferably extracts the plasticiser and results on the one hand in a dramatic increase of the glass transition point of the polymer and on the other hand in a sudden cooling which are the reasons for a spontaneous fixation of the polymer matrix.

Preferably, the polymer starting material in step (a) of the method according to the invention is at least partially crosslinked. Preferably, the crosslinker content in the polymer starting material according to the invention is in a range from 0.01 to 10 mol %, particularly preferably from 0.1 to 1 mol %, based on the monomer used. Preferably, in step (a) of the method according to the invention the swelling is carried out at ambient pressure, i.e., in the range of 0.8 to 1.2 bar. During the swelling in step (a) the temperature is preferably ambient temperature, i.e. in a range from 15 to 30° C. For reasons of process technology it can be advantageous to increase the temperature and the pressure to accelerate the swelling process.

In another embodiment the object of the invention is achieved by a micro- or nanoporous polymer material which is preferably produced by the method according to the invention.

The mean pore size (arithmetic mean of at least 300 counted pores) of the micro- or nanoporous polymer material according to the invention is preferably in a range from 0.01 to 10 μm, particularly preferably in a range from 0.05 to 0.5 μm. The mean pore size can be determined by electron photomicrographs and counting according to example 6.

Alternatively, it may also be preferred that the maximum of the pore size distribution is in a range from 0.01 to 10 μm, particularly preferably in a range from 0.05 to 0.5 μm. The pore size distribution can be a Poisson distribution, for example.

Preferably, the micro- or nanoporous material is not soluble in its own monomer. This is a very important preferred property of the material. This clearly shows that polymer strands (i.e. polymer chains the polymer material according to the invention consists of) are preferably bonded to each other not only by physical forces but covalent chemical bonds exist. Therefore, the foam is preferably covalently (and not only physically) bonded.

The polymer material and/or the starting material are preferably partially crosslinked or crosslinked.

Preferably, the crosslinker content in the micro- or nanoporous polymer material of the invention is in a range from 0.01 to 10 mol %, preferably in a range from 0.1 to 1 mol %, particularly preferably in a range from 0.2 to 0.6 mol %, based on the monomers resulting in the polymer. This means that in the case of a crosslinker concentration of 0.01 mol % each 10,000th or for a crosslinker concentration of 10 mol % each 10th molecule is a crosslinker molecule according to statistics. The crosslinker molecules in turn connect two polymer strands with the result that more covalent crosslinking points exist between polymer strands with increasing crosslinker concentration. Since the polymer cannot be completely dissolved without decomposition, a chemical characterisation of the polymer with regard to the degree of polymerisation or the molecular weight distribution is not feasible. However, the swelling degree of the partially crosslinked polymer in a suitable solvent can provide information. The higher the crosslinker content in the polymer, the less solvent can be absorbed by the gel. The higher the interaction of the polymer with the solvent, the more significant the differences of the swelling degree as a function of the crosslinker concentration become. Hence, for example, benzene, toluene or styrene as solvents allow to determine even small differences of crosslinker concentrations in a partially crosslinked polystyrene on the basis of the resulting swelling degree. The crosslinker has two or more polymerisable functional groups and can preferably be divinylbenzene (DVB), ethylene glycol dimethacrylate (EGDMA) or methylene bisacrylamide (MBAA) for polymethyl methacrylate (PMMA) or polystyrene (PS), for example. Up to now, there was the preconception that foam cannot be prepared from (partially) crosslinked polymers. One reason might be that partially crosslinked polymers (copolymers) are not necessarily meltable like thermoplastic polymers and therefore cannot be integrated in a standard foam processing. Now, the inventors surprisingly found that the foams according to the invention can be produced particularly well from (partially) crosslinked starting materials.

The nanoporous polymer foam produced by the described method is preferably characterised by the following properties:

The mean thickness (arithmetic mean) of the webs between the pores is preferably in a range from 5 to 50 nm, particularly preferably in a range from 10 to 35 nm. The web thickness can be determined by electron photomicrographs and counting according to example 6.

Preferably, the micro- or nanoporous polymer material according to the invention is partially closed-cell. Particularly preferably, the micro- or nanoporous polymer material according to the invention is partially open-cell.

The thermal conductivity of the micro- or nanoporous polymer material filled with air at atmospheric pressure is preferably in a range from 1 to 30 mW/(m·K), particularly preferably in a range from 10 to 26 mW/(m·K).

The density of the micro- or nanoporous polymer material according to the invention is preferably in a range from 10 to 300 kg/m$^3$, particularly preferably in a range from 30 to 200 kg/m$^3$.

In another embodiment the object of the invention is achieved by a moulded body made of the micro- or nanoporous material according to the invention.

The moulded body is preferably sealed. That is, the pores of the moulded body forming its surface are closed towards the surface of the moulded body.

Preferably, the moulded body is a polymer particle. This polymer particle can be part of a polymer granulate.

The moulded body preferably has a thermal conduction or thermal conductivity in the range from 1 to 30 mW/(m·K) and particularly preferably in a range from 10 to 26 mW/(m·K).

The novel use of polymer particles or polymer granulate instead of polymer plates allows to reduce all process parameters such as temperature, pressure and time due to the significantly larger surface and said parameters are largely independent of scaling. Hence, large quantities of the material can easily be produced.

The duration of the swelling process of the polymer particles according to the invention with a suitable plasticiser such as acetone, for example, for a copolymer such as polystyrene/DVB, for example (originally from several hours to several days for a polymer plate (0.5×5×5 (cm$^3$)), is preferably in a range from 1 to 60 minutes.

The swelling plasticiser is preferably selected from the group of solvents that are aprotic and/or have a dipole moment below 1.84 Debye (in μ).

The use of a polymer granulate instead of polymer plates/blocks allows to optimise all foaming process parameters in view of an economic process.

If the autoclave volume is larger than the expected volume of the nanofoam, discrete nanoporous polymer particles are obtained after expansion, for example. If the autoclave volume is smaller than the expected volume of the nanofoam, the polymer particles are pressed together when expanding and form a coherent foam body (particle foam body), for example.

The polymer particles can be both poly- and monodisperse. The mean diameter (arithmetic mean) is preferably in a range from 0.2 to 2 mm. The diameter can easily be determined optically under a light microscope.

DETAILED DESCRIPTION OF THE INVENTION

Figure 1:
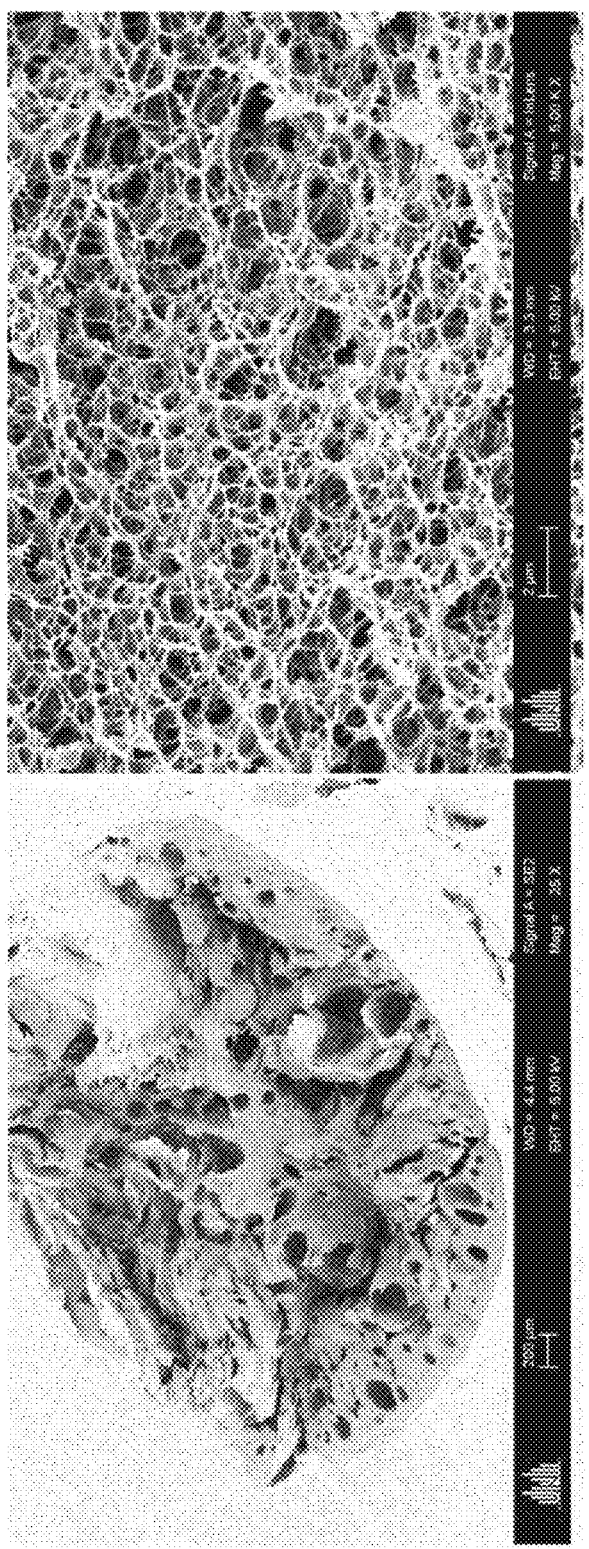
FIG. 1: Scanning electron micrographs of purchased acrylic glass foamed by the NF-GAFFEL method. The mass ratio of acrylic glass to acetone was 1:3. The sample was subjected to a $CO_2$ atmosphere at p=250 bar, T=55° C., t=15 min and subsequently expanded ($t_{exp}$≈1 s). The foam density is 0.35±0.05 g/cm$^3$.

In the inventive method (NF-GAFFEL method) according to aspect (1) of the invention, the polymer starting material consists of one or several polymers, preferably thermoplastic polymers, alternatively preferably crosslinked polymers, very particularly preferably of a copolymer of the group of polymethyl methacrylate (PMMA/crosslinker), polystyrene (PS/crosslinker), polyvinyl chloride (PVC/crosslinker), polylactide (PL/crosslinker), polyethylene (PE/crosslinker), polypropylene (PP/crosslinker), polycarbonate (PC/crosslinker) and cellophane/crosslinker. The plasticiser is preferably selected from the group of ketones (such as acetone) and other polar aprotic solvents and short chain alkanes such as butane, pentane, hexane and cyclohexane, for example; however, acetone is particularly preferred. Here, the mass ratio of the polymer starting material to the plasticiser is preferably in a range from 10:0.5 to 1:3, particularly preferably in a range from 10:2 to 1:1. Preferably, the swelling time is in a range from 0.1 s to 100 h, particularly preferably in a range from 1 s to 1 h.

The starting material preferably contains from 0.01 to 10 mol % of plasticiser. The crosslinker is preferably divinylbenzene (DVB), ethylene glycol dimethacrylate (EGDMA) or methylene bisacrylamide (MBAA).

The preset temperature in step (a) and/or (b), independently of one another, is preferably in a range from 0 to 100° C. and is particularly preferably in step (a) in a range from 15 to 30° C. and independently thereof in step (b) in a range from 30 to 70° C.

It is further preferred that the swelling in step (a) results in a dense packing of polymer latices preferably having a mean particle size in the micrometer and nanometer ranges. It is also preferred that step (a) is carried out in an extruder.

In another preferred embodiment of the method according to the invention, the foaming agent in step (b) is selected from $CO_2$ and other foaming agents which are completely miscible with the plasticiser under high pressure, in particular short chain alkanes such as methane, ethane and propane. The gel is preferably contacted with the foaming agent under a pressure of 10 to 300 bar, particularly preferably from 50 to 200 bar.

In another preferred embodiment the pressure lowering in step (c) takes place within a time ranging from 0.1 s to 60 s in which the polymer material cools and solidifies.

The obtained micro- or nanoporous polymer material preferably has a density from 0.5% to 50% of the density of the polymer starting material and/or a mean pore size from 0.01 to 10 μm.

The NF-GAFFEL method according to the invention could already successfully be carried out in a batch process for copolymers such as PMMA/crosslinker, PS/crosslinker and PVC/crosslinker. The preparation of a coherent polymer gel is important for a successful production of nanoporous polymer materials.

Preferably, the method according to the invention is carried out as a batch method and not as a continuous method.

Preferably, the parameters of pressure and temperature are selected to be above the binary miscibility gap of the plasticiser and particularly preferably thermostatting is carried out for a sufficient time (depending on the sample thickness or the sample volume) so that after expansion foams with pore diameters in the lower micrometer or nanometer range will always be obtained.

Especially desired properties such as, for example, low densities, small pores, open-/closed-pored foam structures, etc. may be obtained by varying the following parameters which can be classified into three production processes:

1. Production of the polymers: In the production of the polymers, the following parameters are particularly preferably important for the final product:

Crosslinker, modifier and copolymer and the concentrations thereof

The type of radical starter and the quantity used

Temperature and duration of the polymerisation reaction

Homogenisation during polymerisation

After treatment of the polymer (purification, extrusion, annealing, etc.)

2. Production of the polymer gels: In the production of the polymer gels, the following parameters are particularly preferably important for the final product:

Plasticisers and the ratio between the solid polymer and the plasticiser

The duration of exposure of the plasticiser in the polymer gel

The saturated polymer gel or defined plasticiser concentrations

3. Production of the polymer foams: here, the following parameters are particularly preferably important:

The type of foaming agent

Pressure, temperature, time

Expansion speed

Preferably, the following parameters are required for the exact composition of the polymer gels.

The mass fraction of the radical starter used refers to the total mass of the sample.

$$\sigma = \frac{m_{starter}}{\sum_i^j m_i}.$$

The mass fraction of the plasticiser in a plasticiser/polymer mixture is defined as follows:

$$\lambda = m_{gelling\ agent}/(m_{gelling\ agent} + m_{polymer}).$$

For an exact composition of the polymer, the concentrations of all additives such as, for example, the crosslinker and the modifier are given on a molar basis as follows:

The molar ratio of a crosslinker in a crosslinker/monomer mixture is given by $$\upsilon = n_{crosslinker}/(n_{crosslinker} + n_{monomer}) \cdot 100.$$

The molar ratio of additional additives such as, for example, a modifier in an additive/monomer crosslinker mixture is given by:

$$\rho = \frac{n_{additive}}{\sum_i^j n_i} \cdot 100.$$

The polymer gel is preferably obtained in time-economic steps depending on the processing form. Thus, for thin films of the order of 1 μm preferably a direct contacting with the plasticiser is expedient. Preferably, bulk materials require either polymer latex powders which are compacted and then soaked with the plasticiser or polymer granulates which are obtained by various methods such as milling or freeze drying. Preferred are polymer starting materials with one dimension, length, width or height, on the order of micrometers to obtain a fast swelling.

After the provision of the required polymer gels the desired foam can be produced by the method (NF-GAFFEL) according to the invention. Both a batch process and a continuous method are suitable for a large-scale implementation of the foaming process. A batch process is particularly preferred for steps b) and/or c).

1. The production of the foams in a batch process can be carried out in accordance with examples 1 to 5. Preferably, this requires matching the scale of the pressure-proof equipment to the desired foam quantity and maintaining the above-mentioned parameters such as pressure, temperature and residence time of the polymer gel in the foaming agent atmosphere, for example. Possible pressure-proof equipment is preferably autoclaves which resist the required process parameters and are already used in industrial processes. Hence, the polymer gels can preferably be contacted with the compressed foaming agent in a closed container and expanded to a solid nanofoam after a sufficient thermostatting.

2. The production of the foams in a continuous process could be realised in an extruder, for example. Since the polymer gels are easily formable already at room temperature, they can be continuously processed in an extruder without supplying heat energy and foamed by adding the foaming agent by the process of the invention (NF-GAFFEL). In this process, energy is introduced into the system preferably in the form of shearing which provides for a steady increase of the polymer gel surface. Here, the formation of the homogeneous mixture of foaming agent and plasticiser in the polymer gel is preferably accelerated and therefore reduces the time of contact between foaming agent and polymer gel. Preferably, large-scale extruders allow adjusting the required parameters of pressure and temperature easily provided that the extruder is sufficiently gasproof. The time of contact between the foaming agent and the polymer gel can preferably be varied by the extrusion canal length and the screw speed. Preferably, the polymer gel filled with foaming agent can be expanded at the extruder end to form a solid nanofoam by opening a valve. Preferably, a pressure gradient resulting in a slow expansion ($t_{exp} \approx 20$ s) is advantageous here (see Example 2.4).

The invention will be further elucidated by the following, non-restrictive examples.

EXAMPLES

Example 1: Polymethyl Methacrylate (PMMA) Nanofoams

Example 1.1: Production of a PMMA Nanofoam by the NF-GAFFEL Method

A PMMA gel was prepared by adding acetone to a sample of a conventional acrylic glass and subsequently foamed with $CO_2$. The expansion time $t_{exp}$ from the initial pressure p=250 bar to the normal pressure of 1 bar was approx. 1 second. The mass ratio of PMMA to acetone in the polymer gel was 1:3 ($\lambda_{acetone}=0.75$). The gel was contacted with $CO_2$ in a high-pressure cell at p=250 bar, T=55° C. and t=15 min and subsequently expanded. FIG. 1 shows the foam structure at two different magnifications.

The gel/foam composition was: σ=unknown, acetone $\lambda_{acetone}=0.75$, n=unknown, ρ=unknown.

Example 1.2: Production of a PMMA Nanofoam by the NF-GAFFEL Method

A PMMA consisting of the monomer methyl methacrylate (MMA) and the crosslinker N,N'-methylene bisacrylamide (MBAA) was polymerised using the radical starter azobisisobutyronitrile (AIBN) at T=95° C. and a period of 2 h. Example 1.2 illustrates the different impacts of two different crosslinker concentrations on the obtained foam structure. A polymer saturated with acetone was prepared and contacted with $CO_2$ and foamed as in Example 1 at p=250 bar, T=55° C. and t=15 min. This example demonstrates the successful application of the NF-GAFFEL method using a PMMA sample with a precisely known composition.

Figure 2:
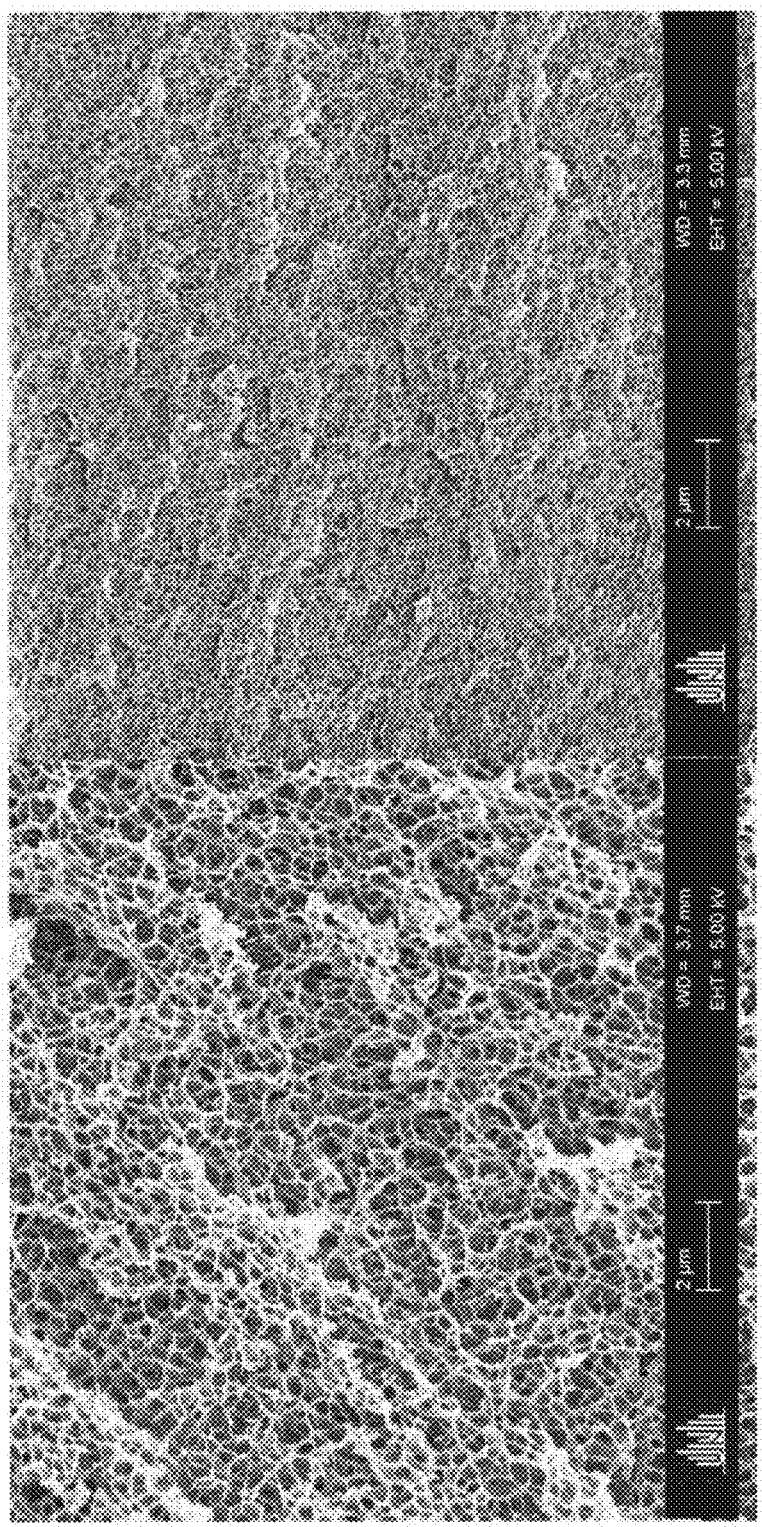
FIG. 2: Scanning electron micrographs of PMMA foamed by the NF-GAFFEL method. The PMMA gel was saturated with acetone. The samples were subjected to a $CO_2$ atmosphere at p=250 bar, T=55° C., t=15 min and subsequently expanded ($t_{exp}$≈1 s). The crosslinker concentration (MBAA) was v=0.2 mol % in the left foam and v=0.7 mol % in the right foam. The foam densities have values of 0.35±0.05 g/cm$^3$ (left) and 0.40±0.05 g/cm$^3$ (right).

The left-hand portion of FIG. 2 shows the effect on the resulting foam structure at a crosslinker content of v=0.2 mol % and the right-hand portion of FIG. 2 shows a distinctly smaller foam structure due to the effect of v=0.7 of crosslinker.

The gel/foam composition was: $\sigma_{AIBN}$=0.004, $\lambda_{acetone}$=saturated, $v_{MBAA}$=0.20 mol % (left)/0.70 mol % (right).

Example 1.3: Production of a PMMA Nanofoam by the NF-GAFFEL Method

Figure 3:
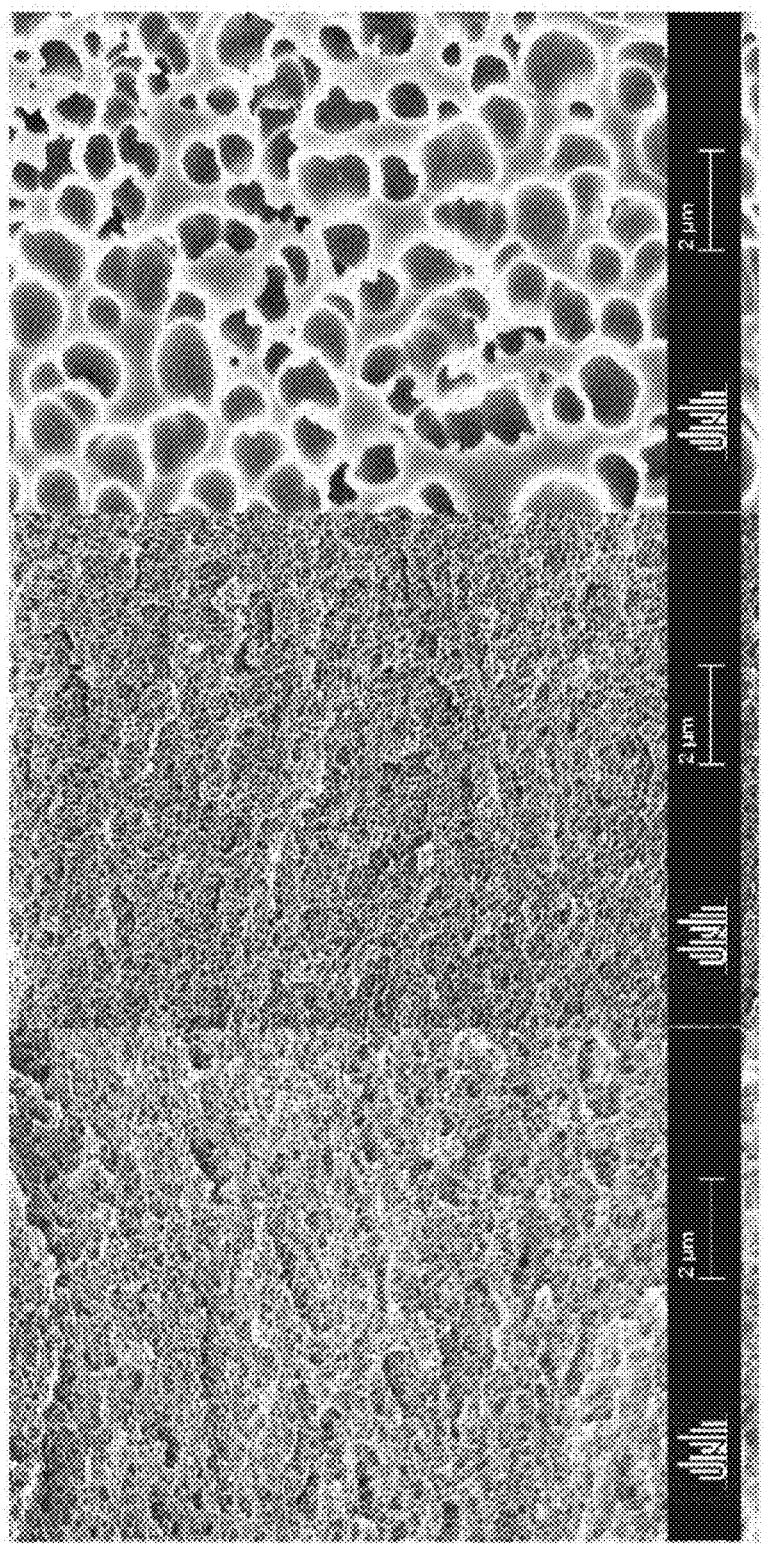
FIG. 3: Scanning electron micrographs of PMMA foamed by the NF-GAFFEL method. The PMMA gel was saturated with acetone. The samples were subjected to a $CO_2$ atmosphere at p=250 bar, t=15 min and subsequently expanded ($t_{exp}$≈1 s). The crosslinker concentration (MBAA) was v=0.7 mol % in all foams. The left sample was foamed at a temperature of T=35° C., the middle sample at T=55° C. and the right sample at T=75° C. The foam densities have values of 0.40±0.05 g/cm$^3$ (left), 0.40±0.05 g/cm$^3$ (middle) and 0.40±0.05 g/cm$^3$ (right).

A PMMA consisting of the monomer methyl methacrylate (MMA) and the crosslinker N,N'-methylene bisacrylamide (MBAA) was polymerised using the radical starter azobisisobutyronitrile (AIBN) at T=95° C. and a period of 2 h as in Example 1.2. Example 1.3 illustrates the effect of the foaming temperature on the foam structure. For this purpose the PMMA gel was produced as in Example 2 and contacted with $CO_2$ and foamed at p=250 bar, t=15 min. The $CO_2$ contacting temperature and thus also the expansion temperature was varied. The left-hand portion of FIG. 3 shows the resulting foam structure at T=35° C., in the middle portion the temperature was T=55° C. and in the right-hand portion the temperature was T=75° C.

The gel/foam composition was: $\sigma_{AIBN}$=0.004, $\lambda_{acetone}$=saturated, $v_{MBAA}$ 0.70 mol %.

Example 1.4: Production of a PMMA Nanofoam by the NF-GAFFEL Method

A PMMA consisting of the monomer methyl methacrylate (MMA) and the crosslinker N,N'-methylene bisacrylamide (MBAA) was polymerised using the radical starter azobisisobutyronitrile (AIBN) at T=95° C. and a period of 2 h as in Examples 2 and 3. Example 4 illustrates the effect of the residence time of the gels in the $CO_2$ atmosphere on the foam structure. For this purpose the PMMA gel was produced as in Example 2 and foamed at p=250 bar. The crosslinker concentration was v=0.7 mol % and the foaming temperature was T=55° C. in all experiments.

Figure 4:
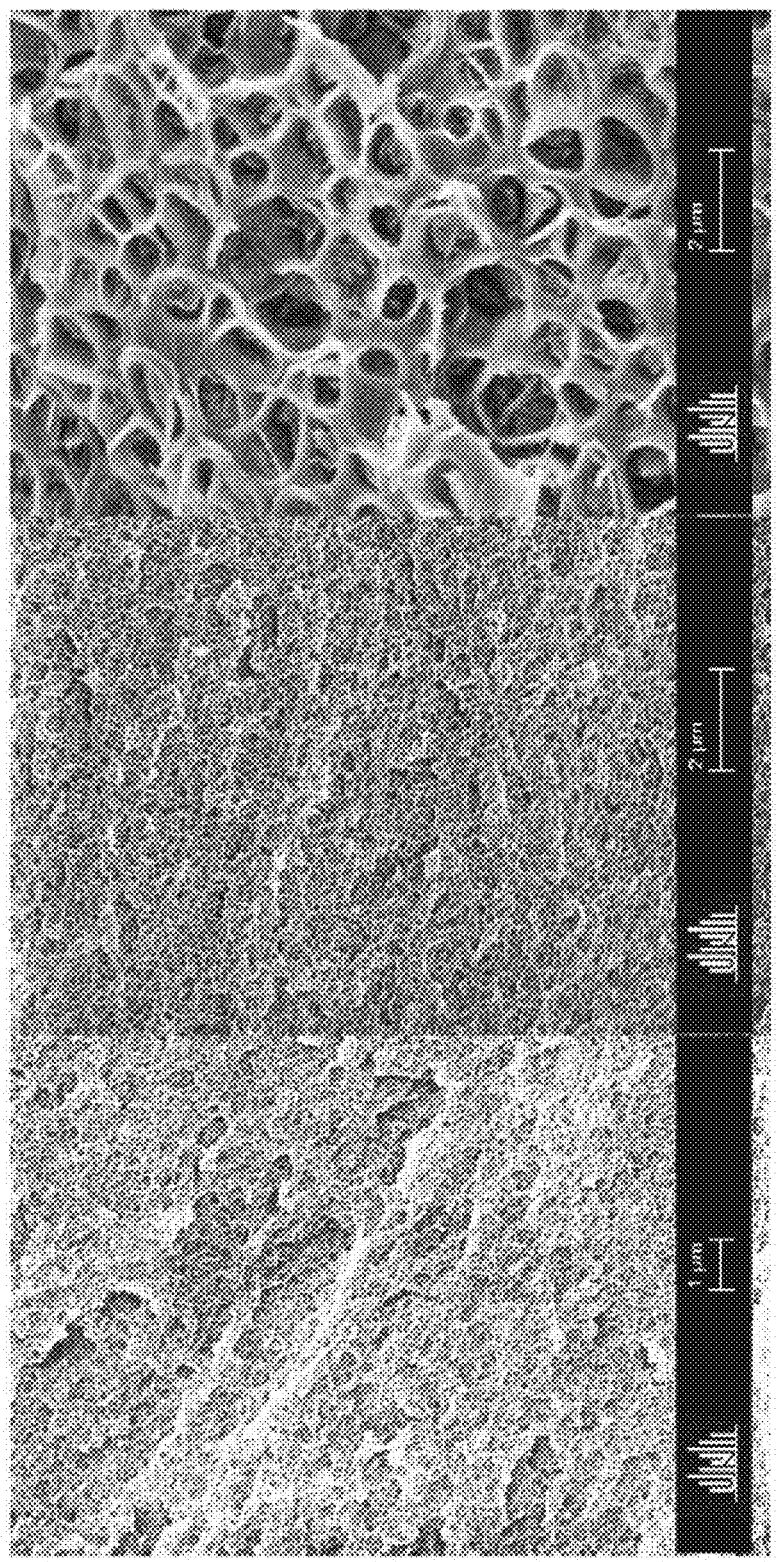
FIG. 4: Scanning electron micrographs of PMMA foamed by the NF-GAFFEL method. The PMMA gel was saturated with acetone. The samples were subjected to a $CO_2$ atmosphere at p=250 bar, T=55° C. and subsequently expanded ($t_{exp} \approx 1$ s). The crosslinker concentration (MBAA) was v=0.7 mol % in all foams. The left sample was foamed after t=5 min, the middle sample after t=15 min and the right sample after t=60 min. The foam densities have values of 0.45±0.05 g/cm³ (left), 0.40±0.05 g/cm³ (middle) and 0.40±0.05 g/cm³ (right).

FIG. 4 shows the results of three foaming experiments varying in the time the gel was subjected to the $CO_2$ atmosphere. The left foam was obtained after a saturation time of t=5 min, the middle foam after t=15 min and the right after t=60 min.

The gel/foam composition was: $\sigma_{AIBN}$=0.004, $\lambda_{acetone}$=saturated, $v_{MBAA}$ 0.70 mol %.

Example 1.5: Production of a PMMA Nanofoam by the NF-GAFFEL Method

A PMMA consisting of the monomer methyl methacrylate (MMA), the crosslinker N,N'-methylene bisacrylamide (MBAA) and the modifier 2-ethylhexylthioglycolate (EHTG) was polymerised using the radical starter azobisisobutyronitrile (AIBN) at T=95° C. and a period of 2 h. Example 5 illustrates the effect of the modifier on the foam structure of two polymers at different crosslinker concentrations. For this purpose the polymers were saturated with acetone and contacted with $CO_2$ and foamed as in the above examples at p=250 bar, T=55° C. and t=15 min. The modifier concentration of ρ=0.50 mol % was the same in both foams.

Figure 5:
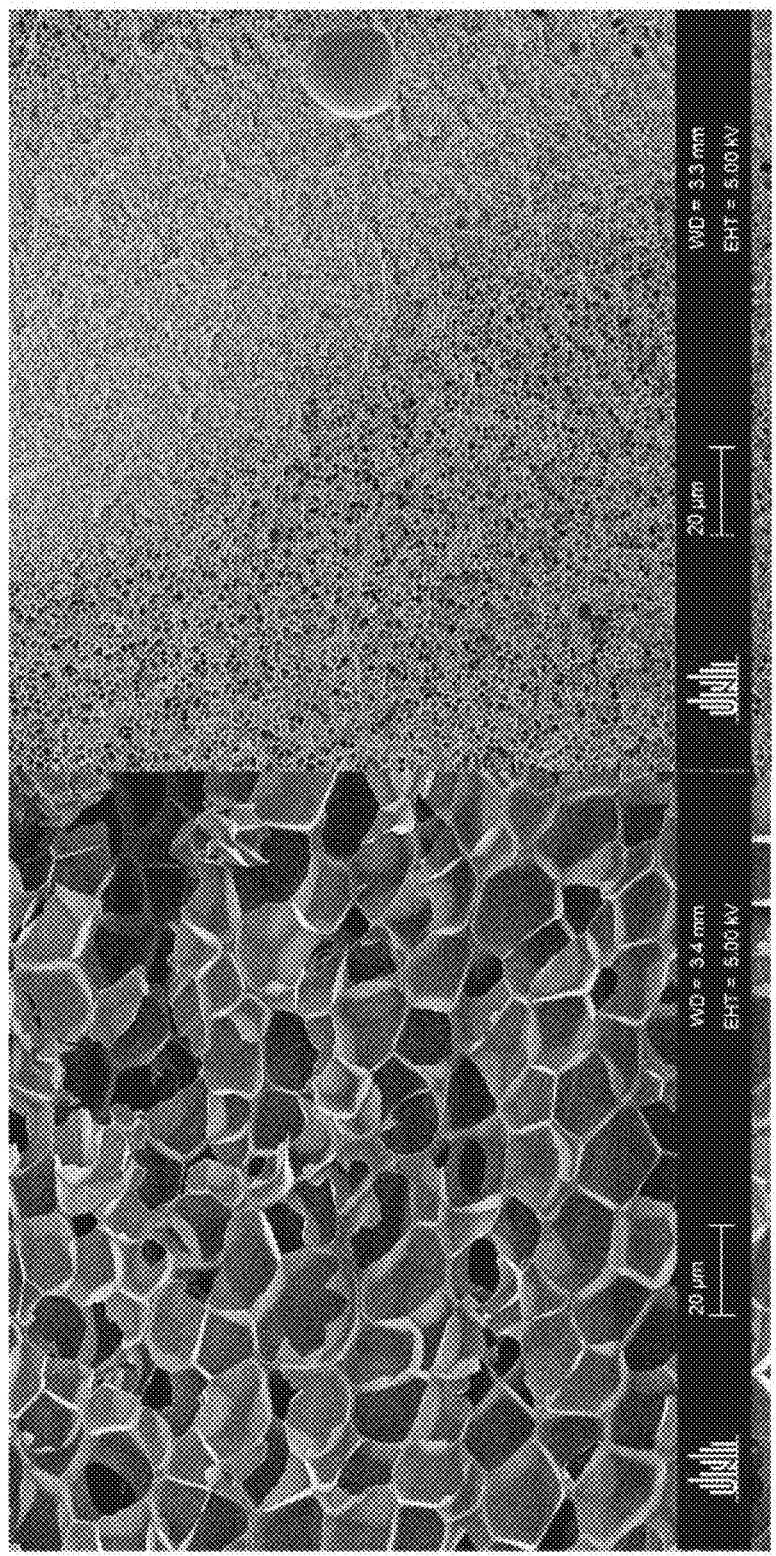
FIG. 5: Scanning electron micrographs of PMMA foamed by the NF-GAFFEL method. The PMMA gel was saturated with acetone. The samples were subjected to a $CO_2$ atmosphere at p=250 bar, T=55° C., t=15 min and subsequently expanded ($t_{exp} \approx 1$ s). The crosslinker concentration (MBAA) was v=0.7 mol % in the left foam and v=1.2 mol % in the right foam. In both samples ρ=0.5 mol % of modifier (EHTG) were present. The foam densities have values of 0.10±0.05 g/cm³ (left) and 0.25±0.05 g/cm³ (right).

The left-hand portion of FIG. 5 shows the effect on the resulting foam structure at a crosslinker content of v=0.7 mol % and the right-hand portion of FIG. 5 shows the effect at v=1.20 mol % of crosslinker. The modifier (EHTG) has an enormous influence on the properties of the foam pores. Monodisperse closed-cell foams having pore sizes in the lower micrometer range (left) and foams with regions of different pore diameters (right) can be produced easily. This allows to produce foams with regions having different properties.

The gel/foam composition was: $\sigma_{AIBN}$=0.004, $\lambda_{acetone}$=saturated, $v_{MBAA}$=0.70 mol % (left)/1.20 mol % (right), $\rho_{EHTG}$=0.50 mol %.

Example 2: Polystyrene (PS) Nanofoams

Example 2.1: Production of PS Nanofoams With Different Pore Sizes by the NF-GAFFEL Method A PS consisting of the monomer styrene and the crosslinker divinylbenzene (DVB) was polymerised using the radical starter azobisisobutyronitrile (AIBN) at T=90° C. and a period of 2 h.

Figure 6:
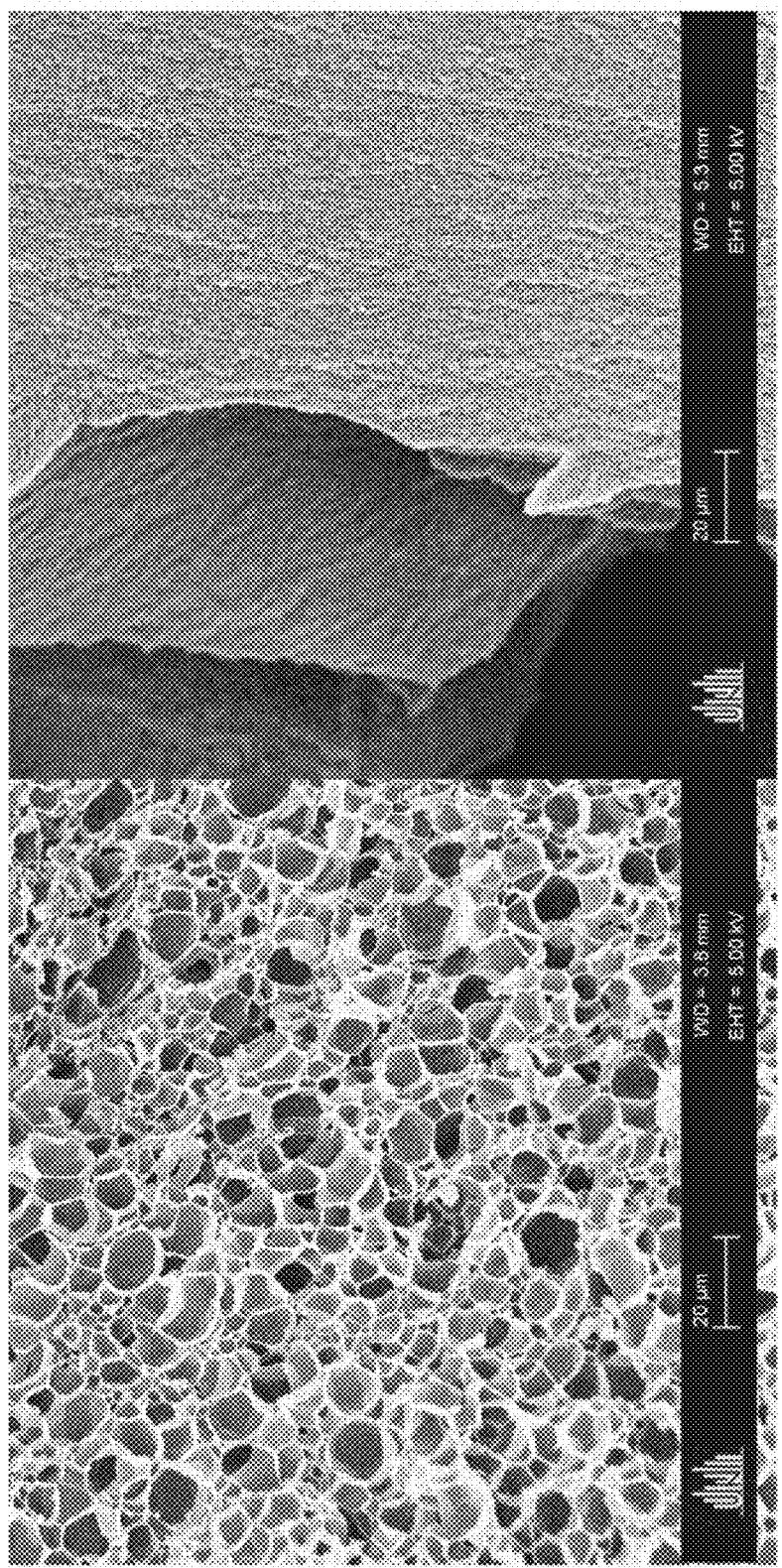
FIG. 6: Scanning electron micrographs of PS foamed by the NF-GAFFEL method. The mass ratio of PS to acetone was 1:1, resp. The samples were subjected to a $CO_2$ atmosphere at p=250 bar, T=55° C., t=15 min and subsequently expanded ($t_{exp} \approx 1$ s). The crosslinker concentration was v=0.5 mol % in the left foam and v=1.0 mol % in the right foam. The foam densities have values of 0.10±0.05 g/cm³ (left) and 0.25±0.05 g/cm³ (right).

A PS gel was prepared from PS and the same weight of acetone ($\lambda_{acetone}$=0.50) and contacted with $CO_2$ in a high-pressure cell at p=250 bar, T=55° C. and t=15 min and subsequently expanded. FIG. 6 shows the foam structure of two samples containing different crosslinker concentrations. The left sample has a crosslinker concentration of v=0.5 mol % and the right sample has a crosslinker concentration of v=1 mol %.

The gel/foam composition was: $\sigma_{AIBN}$=0.004, $\lambda_{acetone}$=saturated, $v_{DVB}$=0.5 mol % (left)/1.00 mol % (right).

Example 2.2: Production of PS Nanofoams by the NF-GAFFEL Method

Figure 7:
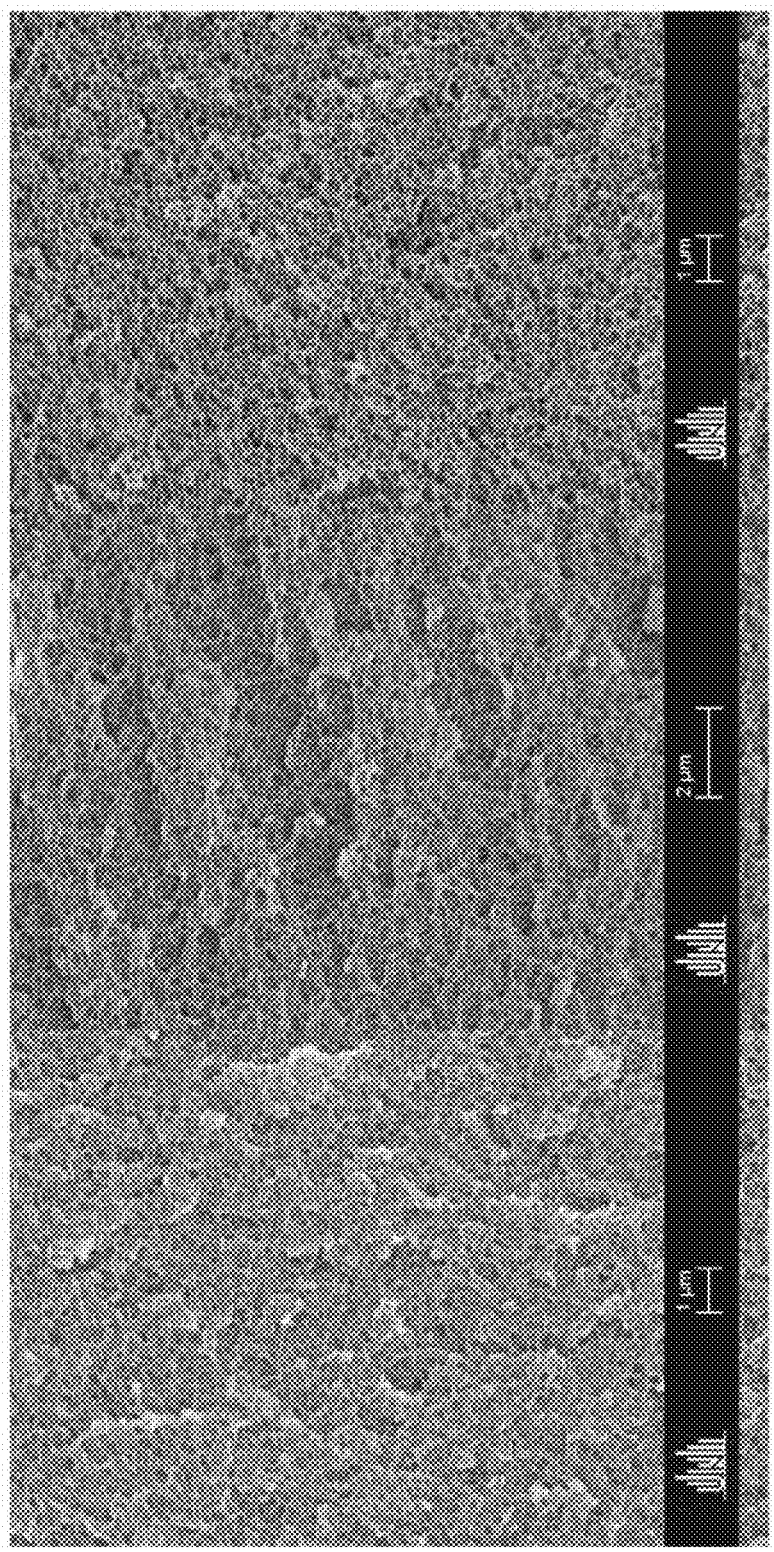
FIG. 7: Scanning electron micrographs of PS foamed by the NF-GAFFEL method. The mass ratio of PS to acetone was 1:1, resp. The samples were subjected to a $CO_2$ atmosphere at p=250 bar, t=15 min and subsequently expanded ($t_{exp} \approx 1$ s). The crosslinker concentration (DVB) was v=1.0 mol % in all foams. The left sample was foamed at a temperature of 35° C., the middle sample at 65° C. and the right sample at 75° C. The foam densities have values of 0.25±0.05 g/cm³ (left), 0.25±0.05 g/cm³ (middle) and 0.20±0.05 g/cm³ (right).

PS gels were produced as in Example 2.1 and contacted with $CO_2$ at p=250 bar, T=55° C. and t=15 min and subsequently expanded. The crosslinker concentration (DVB) was v=1 mol %. Three foaming experiments were conducted at different temperatures. The foam in the left-hand portion of FIG. 7 was obtained at a temperature of T=35° C., the foam in the middle portion at T=65° C. and foam in the right-hand portion at T=75° C.

The gel/foam composition was: $\sigma_{AIBN}$=0.004, $\lambda_{acetone}$=0.50, $v_{DVB}$ 1.00 mol %.

Example 2.3: Production of PS Nanofoams by the NF-GAFFEL Method

Figure 8:
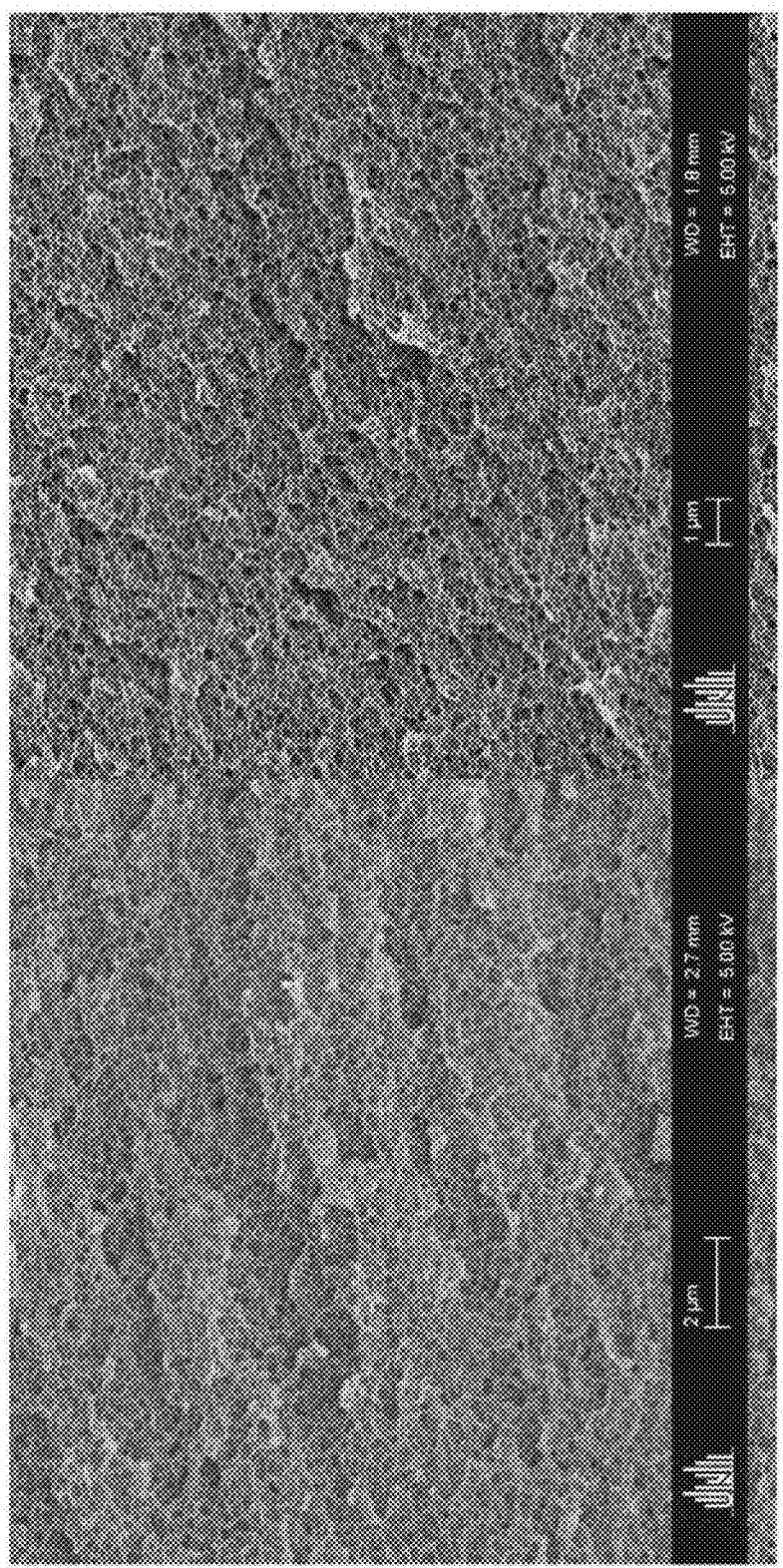
FIG. 8: Scanning electron micrographs of PS foamed by the NF-GAFFEL method. The mass ratio of PS to acetone was 1:1, resp. The samples were subjected to a $CO_2$ atmosphere at T=65° C., t=15 min and subsequently expanded ($t_{exp} \approx 1$ s). The crosslinker concentration (DVB) was v=1.0 mol % in both foams. The left sample was subjected to a $CO_2$ saturation pressure of p=250 bar and the right sample to a $CO_2$ saturation pressure of p=150 bar. The foam densities have values of 0.25±0.05 g/cm³ (left) and 0.25±0.05 g/cm³ (right).

PS gels were produced as in Example 2.1 and subsequently contacted with different $CO_2$ pressures and foamed at T=65° C. after t=15 min. The crosslinker concentration (DVB) was v=1 mol %. In FIG. 8 the left foam resulted from a $CO_2$ pressure of p=250 bar, whereas the right foam was obtained at a $CO_2$ pressure of p=150 bar.

In both experiments the parameters are chosen such that they are above the binary miscibility gap between $CO_2$ and acetone.

The gel/foam composition was: $\sigma_{AIBN}$=0.004, $\lambda_{acetone}$=0.50, $v_{DVB}$1.00 mol %.

Example 2.4: Production of PS Nanofoams by the NF-GAFFEL Method

Figure 9:
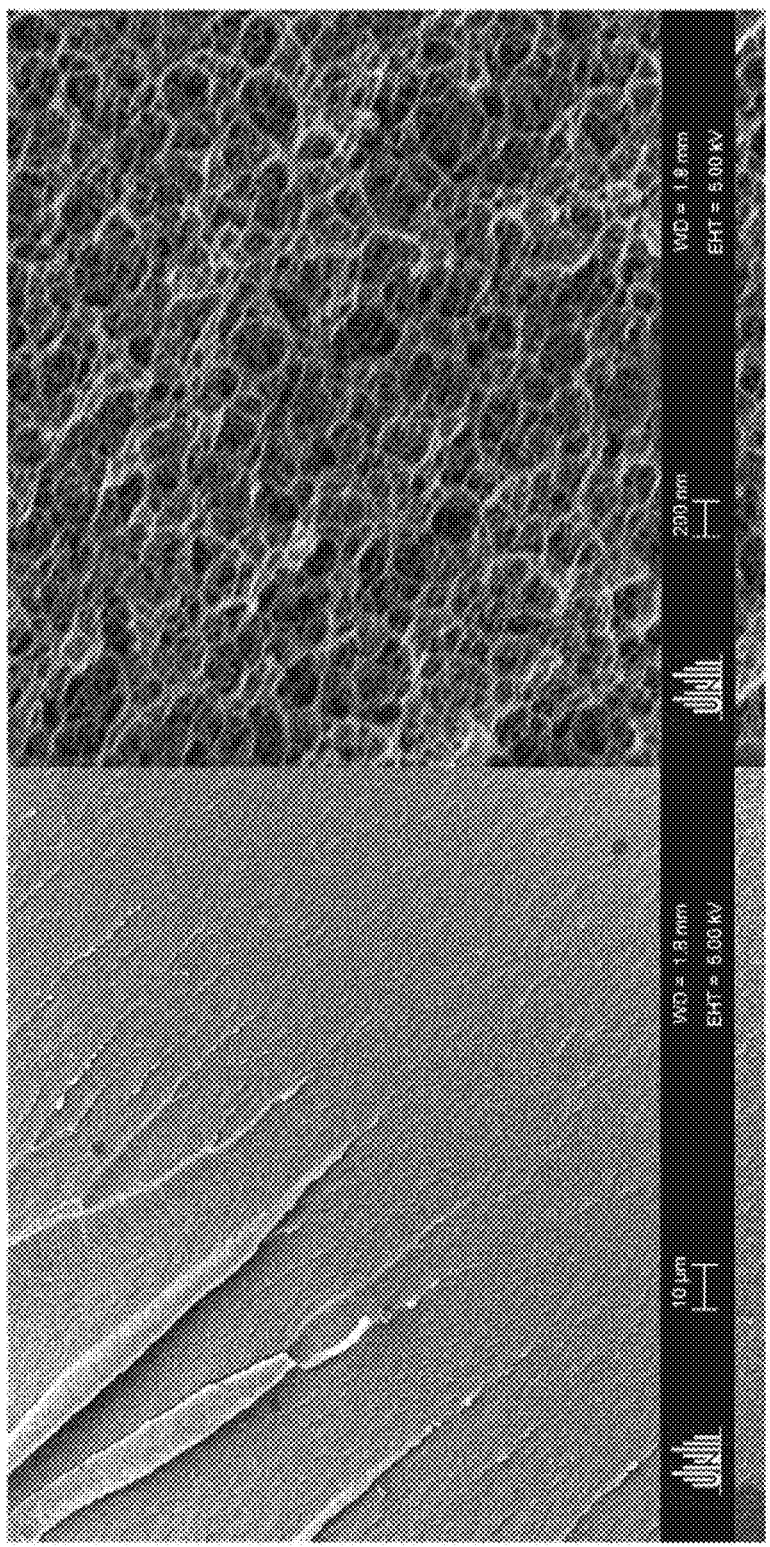
FIG. 9: Scanning electron micrographs of PS foamed by the NF-GAFFEL method. The mass ratio of PS to acetone was 1:1. The sample was subjected to a $CO_2$ atmosphere at p=250 bar, T=60° C., t=15 min and subsequently expanded ($t_{exp} \approx 20$ s). The crosslinker concentration (DVB) was v=2.0 mol %. The foam density is 0.15±0.05 g/cm³.

PS gels were produced as in Example 2.1 and contacted with $CO_2$ at p=250 bar, T=60° C. and t=15 min and subsequently expanded. The crosslinker concentration (DVB) was v=2 mol %. The decisive difference to all previous foaming experiments was the duration of the expansion process from 250 to 1 bar. FIG. 9 shows the foam obtained with a foaming time of $t_{exp} \approx 20$ s.

The gel/foam composition was: $\sigma_{AIBN}$=0.004, $\lambda_{acetone}$=0.50, $v_{DVB}$2.00 mol %.

Figure 10:
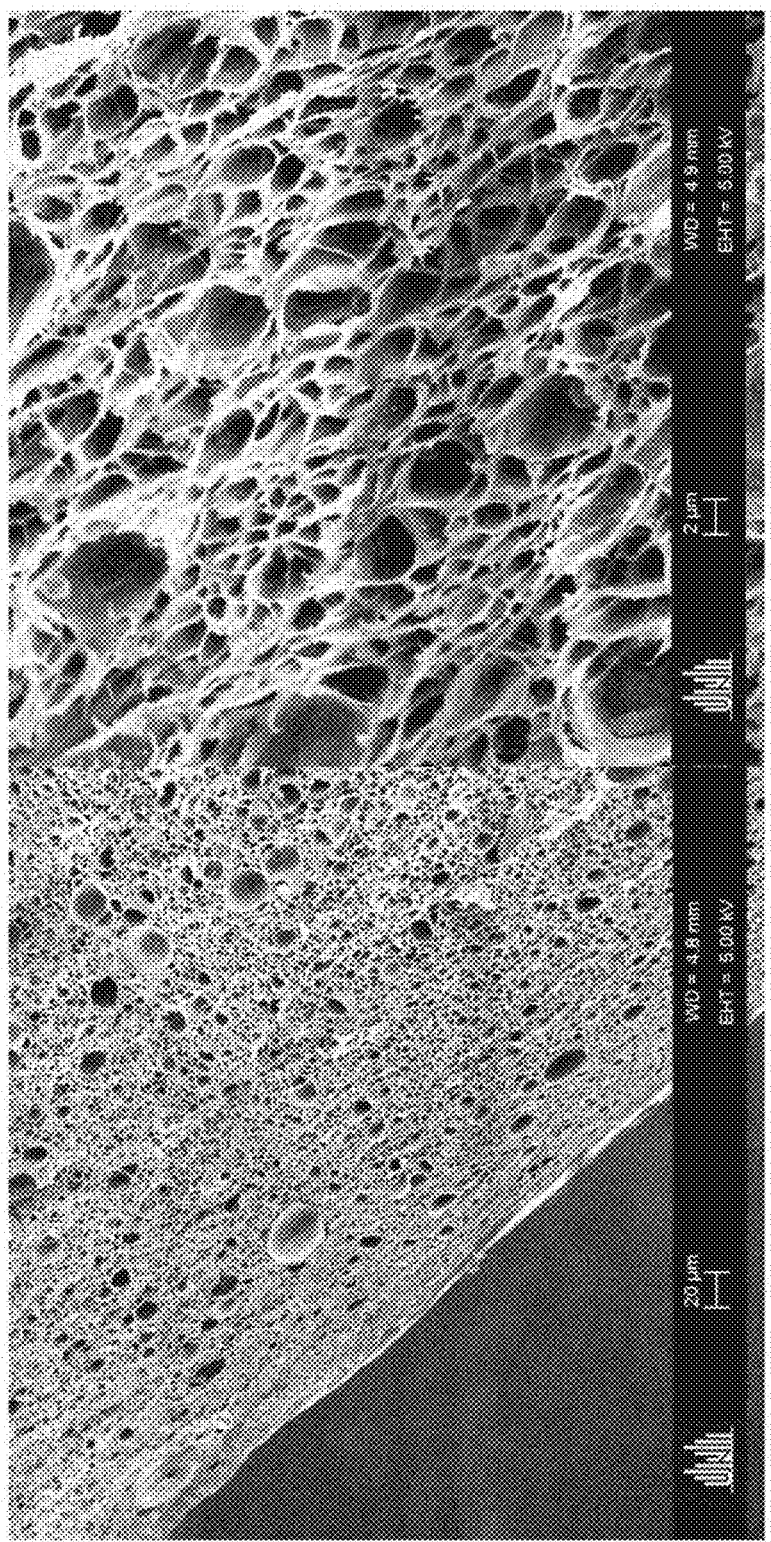
FIG. 10: Scanning electron micrographs of PVC foamed by the NF-GAFFEL method. The sample saturated with acetone was subjected to a $CO_2$ atmosphere at p=250 bar, T=70° C., t=10 min and subsequently expanded ($t_{exp} \approx 1$ s). The foam density is 0.20±0.05 g/cm³.

Example 3: Polyvinyl Chloride (PVC) Nanofoams; Production of a PVC Nanofoam by the NF-GAFFEL Method A saturated PVC gel was prepared by adding acetone to a sample of a conventional PVC polymer and subsequently foamed with $CO_2$. The gel was contacted with $CO_2$ in a high-pressure cell at p=250 bar, T=70° C. and t=10 min and subsequently expanded. FIG. 10 shows the foam structure at two different magnifications.

The gel/foam composition was: $\sigma$=unknown, $\lambda_{acetone}$=saturated, v=unknown, $\rho$=unknown.

Figure 11:
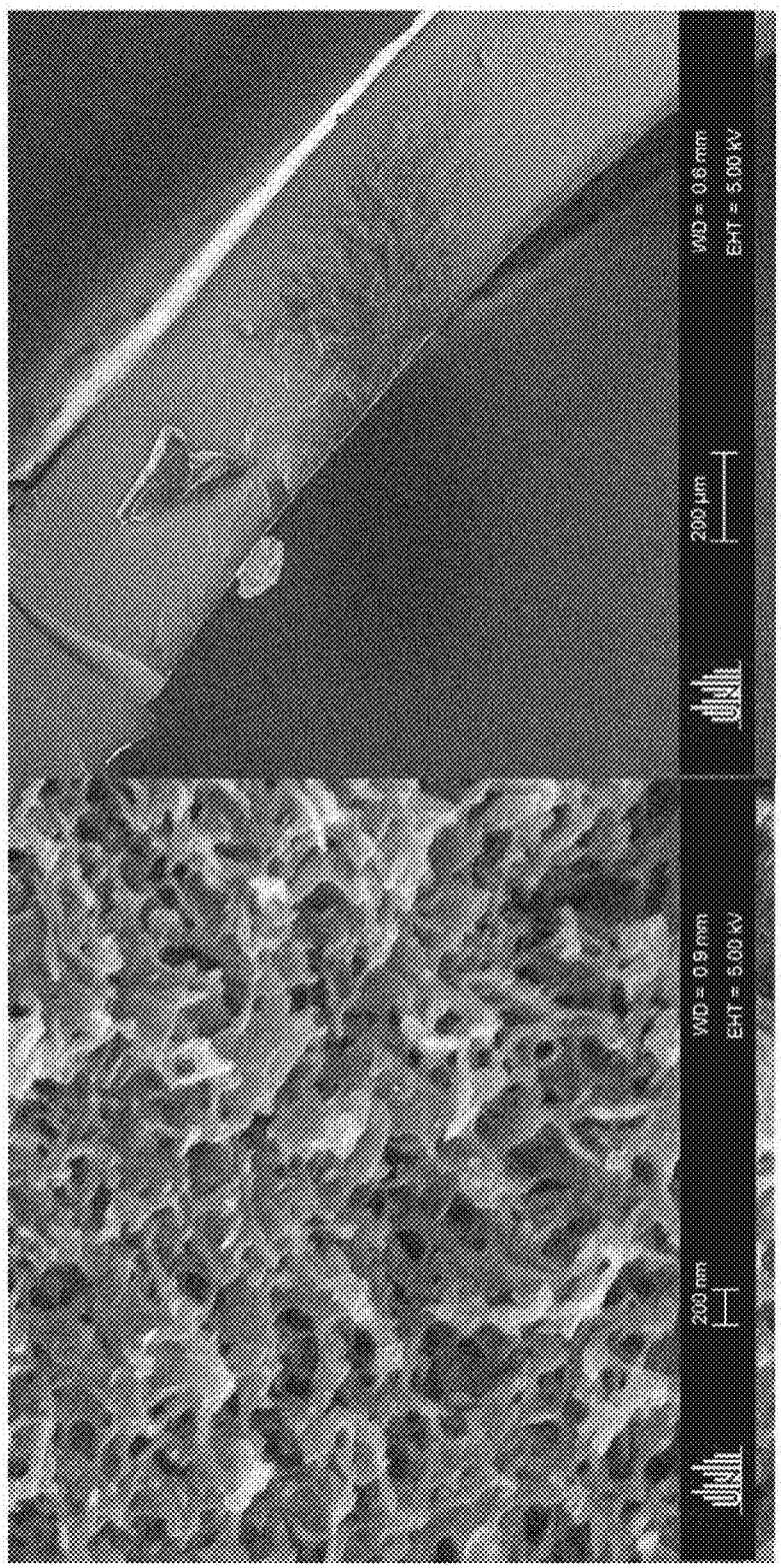
FIG. 11: Scanning electron micrographs of PE foamed by the NF-GAFFEL method. The sample saturated with cyclohexane was subjected to a $CO_2$ atmosphere at p=250 bar, T=70° C., t=15 min and subsequently expanded ($t_{exp} \approx 1$ s). The foam density is 0.35±0.05 g/cm³.

Example 4: Polyethylene (PE) Nanofoams; Production of a PE Nanofoam by the NF-GAFFEL Method A saturated PE gel was prepared by adding cyclohexane to a sample of a conventional PE polymer at 60° C. and subsequently foamed with $CO_2$. The gel was contacted with $CO_2$ in a high-pressure cell at p=250 bar, T=70° C. and t=15 min and subsequently expanded. FIG. 11 shows the foam structure at two different magnifications.

The gel/foam composition was: $\sigma$=unknown, $\lambda_{cyclohexane}$=saturated, v=unknown, $\rho$=unknown.

Example 5: Preparation of 10 g of Nanoporous Polystyrene Particles

Figure 12:
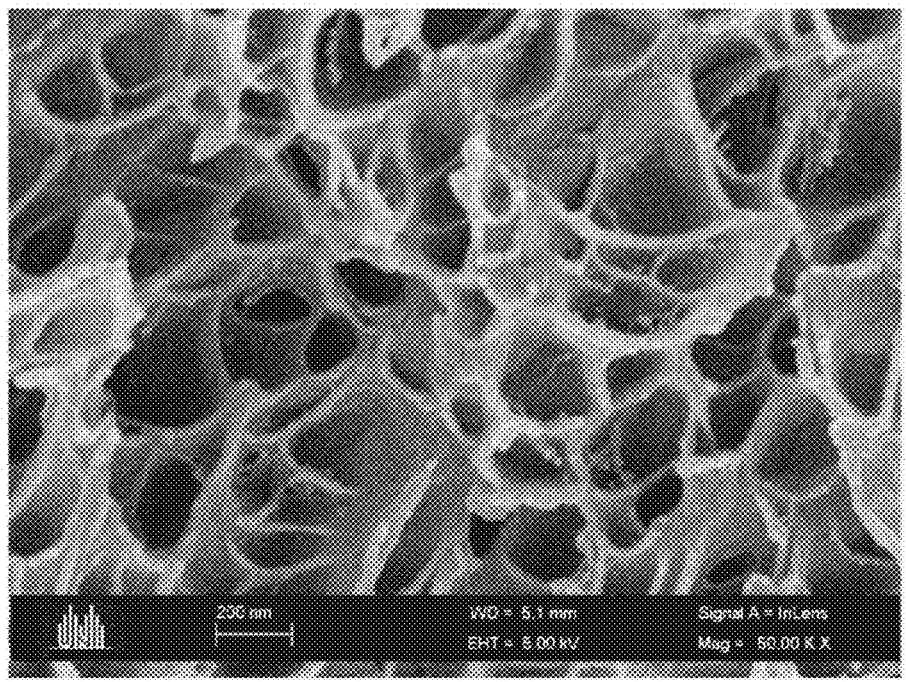
FIG. 12: Scanning electron micrograph of the nanostructure of the polystyrene material given in example 6.

Ten grams of crosslinked polystyrene particles (mean diameter≈1 mm, 1 mol % of DVB as crosslinker) is contacted with 20 g of acetone in a sealed vessel for 180 minutes at room temperature and under normal pressure. Due to the different refractive indexes of the polymer and the polymer gel, swelling could be followed visually to determine when the polystyrene particles were completely converted into the polymer gel. The polystyrene gel particles were dimensionally stable and had a spherical shape but were—contrary to the starting polymer—deformable by slight mechanical impact. Then, the swollen polystyrene particles were subjected to a $CO_2$ atmosphere at 200 bar and 70° C. for 90 minutes. A pressure relief resulted in nanoporous polystyrene particles with a mean diameter of 2 mm and a density <0.30 g/cm³ and a mean nanopore diameter <500 nm (see FIG. 12).

Example 6: Determination of the Structure of the Nanoporous Materials

Figure 13:
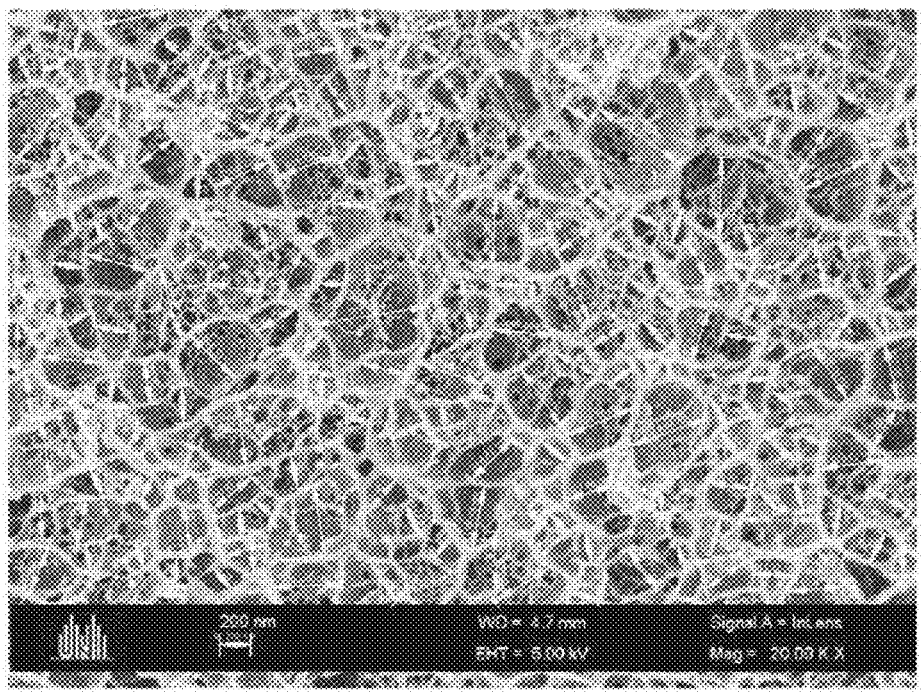
FIG. 13: Scanning electron micrograph of a nanoporous polymer material used for the determination of pore diameters with the Datinf Measure computer program.

In order to image the structure of the produced nanoporous materials, first a fresh fracture edge was created. Subsequently, the sample was fixed on the sample plate with the fracture edge facing upward. In order to dissipate the charge generated during measurement, conductive silver lacquer was used for fixation. Prior to imaging, the sample was coated with gold in order to avoid local charging effects. For this purpose the K950X coating system with the K350 sputter attachment from EMITECH was used. In all cases gold sputtering was performed under an argon pressure of approx. $10^{-2}$ mbar, always applying a current of 30 mA for 30 seconds. The layer thickness of the gold layer coated in this way was approximately between 5 and 15 nm. The electron photomicrographs were taken with a device of the SUPRA 40 VP type from ZEISS. Acceleration voltages up to 30 kV and a maximum resolution of 1.3 nm are possible with this device. Micrographs were recorded with the InLens detector at an acceleration voltage of 5 kV. In order to determine the mean pore diameter and the mean web thickness of the nano- and microporous foams, a micrograph taken with the described scanning electron microscope was chosen and at least 300 pores or webs were measured with the Datinf Measure computer program to ensure a sufficiently good statistics. Since each scanning electron micrograph contains only a limited number of pores and webs, several scanning electron micrographs are used for the determination of the mean pore and web diameters. Here it should be ensured that the magnification is chosen such that the error in the length determination is kept as small as possible. An example is shown in the Annex in FIG. 13.

The features of the invention disclosed in the present description, in the drawings as well as in the claims both individually and in any combination may be essential to the realization of the various embodiments of the invention.

The invention claimed is:

1. A method of producing a micro- or nano-porous polymer material,
    swelling a polymer starting material using a plasticizer at a predetermined temperature to make the polymer starting material visco-elastic deformable, wherein the polymer starting material is at least partially cross-linked and the crosslinker content in the polymer starting material is in a range from 0.01 to 10 mol %, wherein the predetermined temperature is in a range from 0 to 100° C.;
    subsequently, contacting the swollen polymer starting material with a foaming agent under a first pressure; and
    subsequently, depressurizing from the first pressure to a second pressure such that the swollen polymer starting material further expands and solidifies to obtain a micro- or nanoporous material.

2. The method according to claim 1,
    wherein the polymer starting material consists of one or several particularly thermoplastic polymers,
    wherein the plasticizer is selected from acetone and other polar aprotic solvents and a group of alkanes consisting of butane, pentane, hexane and cyclohexane,
    wherein the mass ratio of polymer starting material to plasticizer is 10:0.5 to 1:3, and
    wherein swelling of the polymer starting material is performed for a time period of 0.1 second to 100 hour.

3. The method according to claim 1, wherein the swelling of polymer starting material results in a dense packing of polymer latices having a mean particle size in the micrometer and nanometer ranges.

4. The method according to claim 1, wherein the swelling of polymer starting material is carried out in an extruder.

5. The method according to claim 1, wherein the foaming agent comprises at least one selected from $CO_2$ and other foaming agents that are completely miscible with the plasticizer under high pressure, and wherein the first pressure is in a range from 10 to 300 bar.

6. The method according to claim 1, wherein depressurizing from the first pressure to the second pressure takes place within 0.1 to 60 second.

7. The method according to claim 1, wherein the obtained micro- or nanoporous polymer material has a density from 0.5% to 50% of the density of the polymer starting material and a mean pore size from 0.01 to 10 μm.

8. The method according to claim 1, wherein the polymer starting material consists of one or more selected from a group of polymethyl methacrylate (PMMA), polystyrene (PS), polyvinyl chloride (PVC), polylactide (PL), polyethylene (PE), polypropylene (PP), polycarbonate (PC) and cellophane.

9. The method according to claim 1, wherein the mass ratio of polymer starting material to plasticizer is 10:2 to 1:1.

10. The method according to claim 1, wherein swelling of the polymer starting material is performed for a time period of 1 second to 1 hour.

11. The method according to claim 1, wherein that the obtained micro- or nanoporous polymer material is not soluble in its own monomer.

12. The method according to claim 5, wherein the foaming agent comprises at least one alkane selected from a group consisting of methane, ethane, and propane, and wherein the first pressure is in a range from 50 to 200 bar.

13. The method according to claim 1, wherein the first pressure is 250 bar and the second pressure is 1 bar, wherein the depressurizing from the first pressure to the second pressure takes place in 1 second.

* * * * *

UNITED STATES PATENT AND TRADEMARK OFFICE
CERTIFICATE OF CORRECTION

PATENT NO. : 10,246,568 B2
APPLICATION NO. : 15/036769
DATED : April 9, 2019
INVENTOR(S) : Strey et al.

It is certified that error appears in the above-identified patent and that said Letters Patent is hereby corrected as shown below:

On the Title Page

Item (56), Column 2, Line 11, under Other Publications, change "Crystallization."" to --Crystallization"--.

In the Specification

Column 7, Line 67, change "Datinf" to --Dating--.

Column 14, Line 21, change "Datinf" to --Dating--.

Signed and Sealed this
Ninth Day of February, 2021

Drew Hirshfeld
*Performing the Functions and Duties of the
Under Secretary of Commerce for Intellectual Property and
Director of the United States Patent and Trademark Office*